Oct. 27, 1953  G. F. J. DANDRIDGE  2,656,641
VERMIN-TRAP
Filed Nov. 14, 1949

Inventor
George F. J. Dandridge
By Shoemaker & Mattare
Attorneys

Patented Oct. 27, 1953

2,656,641

UNITED STATES PATENT OFFICE 2,656,641

VERMIN-TRAP

George Francis John Dandridge, Loughton, England

Application November 14, 1949, Serial No. 127,028
In Great Britain January 27, 1949

2 Claims. (Cl. 43—83)

This invention relates to a vermin-trap of the kind in which a member when depressed, releases a catch or detent which has held back a striking-member in its stressed position, such as a spring-urged, throw-over lever mounted on a base. The invention has been more particularly designed for use in trapping mice.

The invention has for its principal object to provide a very sensitive detent and release device for a vermin-trap. It also has for an object to provide a vermin-trap with a self-setting catch or detent which obviates the necessity for delicate simultaneous but separate manipulation of the detent and the throw-over lever. Further objects are to provide a vermin-trap in which the bait remains stationary so as to attract the attention of the animal without distracting or frightening it, and to provide a vermin-trap which can be baited or re-baited after the trap has been set, without thereby releasing the trap. In my improved trap, the retaining catch or detent is automatically cocked when the striking member is brought back to its "trap-set" position.

The invention is hereafter described with reference to the accompanying drawings, in which.

Figure 1:
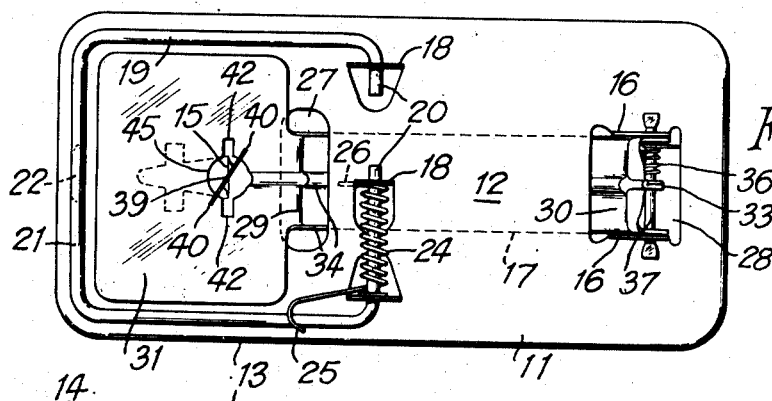
Fig. 1 is a plan view of the trap in its normal position, before setting or after release of the striking member.

The base 11 comprises an upper surface 12 and dependent side walls 13, preferably having spaced feet 14 arranged to provide three-point support upon a floor or shelf on which the trap is to be laid; the upper surface 12 is pierced to provide an upstanding lug 15 forming the bait-support, two shorter lugs 16 for the pivotal mounting of a platform lever 17, and three lugs 18 for the pivotal mounting of the striking member.

The striking member is conveniently made as a U-shaped lever 19, consisting for example of stiff wire with inturned ends 20 engaging with the mounting lugs 18, one of these ends 20 being long enough to engage two of the lugs 18. The cross piece 21 of the lever 19 may have an upper flat portion 22 thereon for engagement by the beak of the retaining catch or detent as hereafter explained and this cross-piece 21 may also have a lower flat portion thereon where it contacts and rides down the curved top of said catch. A spring 24 coiled around the longer end 20 of the striking member, between the two lugs 18 engaged by that end, has a hook 25 engaging one side of the U-shaped lever 19, its opposite extremity 26 engaging with the base 11.

The platform lever 17 is bent upwardly at each end, its intermediate portion extending along beneath the upper surface 12 of the base, which is apertured at 27 and 28 for free passage of the upwardly bent end portions 29, 30; these end portions are continued to form the depressible member or platform 31 and the stem 32 of the catch 33 respectively, the platform being substantially parallel to the surface 12 and the catch being substantially at right angles thereto.

In the construction illustrated, the improved trap is made mainly of sheet metal, having its base 11 formed by one stamping and the platform 31 and catch 33 with their connecting lever 17 (see Fig. 7) formed by another stamping. The said platform, lever and catch are thus of unitary construction.

Figure 2:
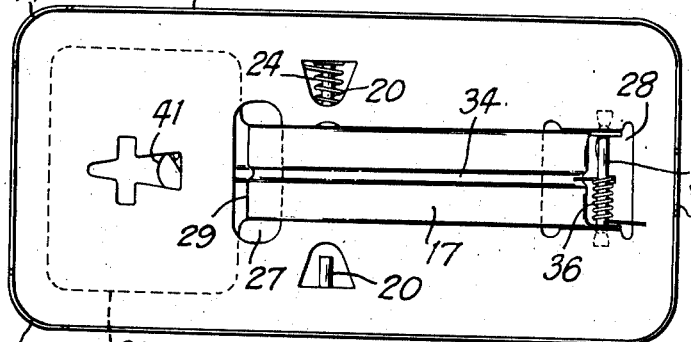
Fig. 2 is an inverted plan.

The lever 17 has its intermediate and end portions stiffened by longitudinal flanges or ribs 34 so that it is sufficiently rigid not to flex appreciably; otherwise the sensitivity of the catch 33 when engaging the cross piece 21 of the striking member 19 would be affected. The detent or catch is formed with a retaining face or tooth 35 adapted to hook over the flat portion 22 on the striking member; a light spring 36 coiled around the pivot pin 37 with one end bearing against the underside of the base 11 and the other end engaged in the hollow of the central rib 34 (Fig. 2), acts to push the catch towards the engaging position and at the same time to lift the platform 31.

As seen in Figs. 3 to 7, the lever 17 has its central rib 34 continued up the end portion 29 and also up the stem 32 of the beak or catch 33, the side edges or flanges of which are folded together to provide a double thickness of metal for the tooth 35 and upper part of the catch; similarly the central rib 34 is continued up the end portion 30 and partly over the platform 31.

Figures 4, 5, 6, 7:
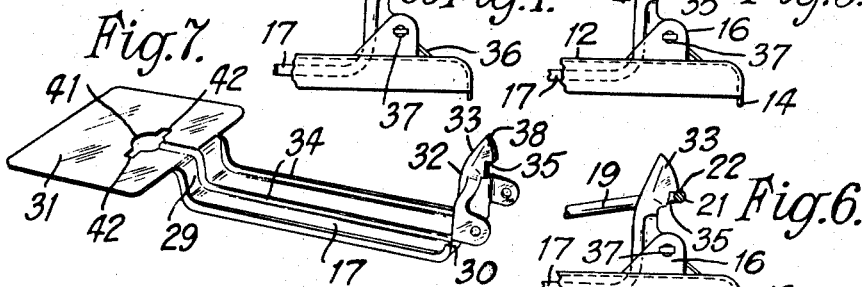
Fig. 4 is a detail, in side elevation, showing the striking member being thrown over to engage the catch.
Fig. 5 is a similar view, showing the striking member contacting the catch.
Fig. 6 is a similar view, showing the striking member fully engaged by the catch.
Fig. 7 is a perspective view of the integral platform, catch and connecting lever.

The top 38 of the catch 33 is outwardly curved or rounded to form a cam so that when contacted by the striking member 19, as shown in Fig. 5, while the striking member is being moved towards its starting position to set the trap, the cross-piece 21 tilts the catch 33 against the action of its spring 36 to allow the striking member 19 to engage its flat portion 22 automatically under the tooth 35.

Figure 3:
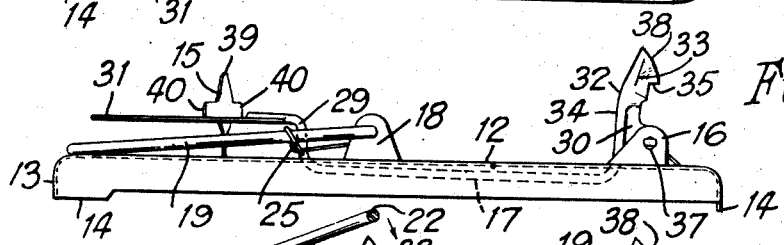
Fig. 3 is a side elevation of the trap, in its normal or released position.

The trap is thus remarkably easy to set and the automatic engagement of the parts to attain the "trap-set" position presents no difficulty; in setting the trap, it is only necessary to raise the striking member 19 from its normal position, shown in Fig. 3, throwing it back against the action of its spring 24, until the cross-piece 21 of the striking member contacts the beak (see Fig. 5) and rides down the cam top 38 of the latter before slipping under the tooth 35 (see Fig. 6), the beak being then automatically spring-pressed over the cross-piece 21.

The bait-supporting lug 15, formed out of the metal of the base surface 12, has a central spike 39 and two oppositely-directed arms 40 projecting from the axis of the latter. The spike and arms extend up through an aperture or slot 41 in the depressible member 31, the slot having preferably two opposite bays or notches 42 for passage of the said arms, which are then twisted to the position shown in Fig. 1, so as to overlie the platform 31 and limit the upward movement of the latter. The slot 41 is sufficiently large to avoid making contact with the bait support 15.

When the animal steps on the platform 31 at one end of the base 11 the platform is depressed and this causes the catch 33 at the other end of the base to be displaced from its retaining or "trap-set" position by means of the intermediate portion of the pivoted lever 17.

It will be noted that the bait-support does not move with the depressible member or platform 31 so that the bait remains stationary and continuously engages the attention of the animal when the latter steps or presses upon the platform.

The retaining face or tooth 35 of the catch or beak 33 retains the striking member 19 in the spring-stressed position when the trap is set, and its rigid connection to the platform ensures that it can only be released by descent of the platform 31, that is, independently of the bait-support. The trap can therefore be baited, or if necessary re-baited, either before or after setting.

What I claim is:

1. A vermin-trap of the kind described, comprising in combination a base, a spring-urged striking member, a pivotally mounted catch including an abutment normally engaging and holding back said striking member, a depressible member for the release of said catch, a lever extending along said base and connecting said depressible member to said catch, a stationary bait-support integral with said base, said bait-support including a central spike and two oppositely-directed arms, said depressible member having a slot through which said bait-support extends upwardly, said bait-support spike having a twisted portion to position said arms obliquely of and across said slot so that the arms engage the portions of the depressible member adjacent the slot after being passed up therethrough, and spring means for normally causing said lever to lift said depressible member and bring said catch to the engaged position of said abutment for holding back said striking member, said bait-support arms limiting the lift of said depressible member and the pivotal movement of said catch, and said catch also including a surface overridden by said striking member in the setting of the trap for rocking said catch from its position limited by said bait-support arms against the action of said spring means prior to the engagement of said abutment with said striking member.

2. A mouse-trap of the kind described, comprising in combination a base, a spring-urged striking member, a catch normally engaging and holding back said striking member, a pivot-pin for said catch mounted upon said base towards one end thereof, a depressible platform towards the other end of said base, said platform having an aperture therein, a lever extending along said base, said lever being integral with said catch and platform and including longitudinal stiffening ribs, a stationary bait-support mounted upon said base and extending freely upwards through the aperture in said platform, and a torsion spring coiled around said pivot-pin, said spring having two projecting ends, one of said spring ends bearing against said base and the other of said spring ends extending into one of the stiffening ribs of said lever.

GEORGE FRANCIS JOHN DANDRIDGE.

References Cited in the file of this patent

UNITED STATES PATENTS

| Number | Name | Date |
|---|---|---|
| 580,861 | Hall | Apr. 20, 1897 |
| 645,589 | Erickson | Mar. 20, 1900 |
| 690,970 | Lewis | Jan. 14, 1902 |
| 1,011,605 | Fulks | Dec. 12, 1911 |
| 1,405,229 | Kopke | Jan. 31, 1922 |
| 2,031,520 | Zahm | Feb. 18, 1936 |

FOREIGN PATENTS

| Number | Country | Date |
|---|---|---|
| 41,561 | Sweden | Nov. 8, 1916 |
| 383,051 | Great Britain | Nov. 10, 1932 |
| 600,323 | Great Britain | Apr. 6, 1948 |
| 744,730 | France | Jan. 26, 1933 |